United States Patent
Ishitsuka et al.

(10) Patent No.: US 11,465,260 B2
(45) Date of Patent: Oct. 11, 2022

(54) METHOD FOR PRODUCING SYNTHETIC QUARTZ GLASS SUBSTRATE

(71) Applicant: Shin-Etsu Chemical Co., Ltd., Tokyo (JP)

(72) Inventors: Yoko Ishitsuka, Joetsu (JP); Atsushi Watabe, Joetsu (JP); Masaki Takeuchi, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 718 days.

(21) Appl. No.: 16/431,315

(22) Filed: Jun. 4, 2019

(65) Prior Publication Data
US 2019/0366510 A1     Dec. 5, 2019

(30) Foreign Application Priority Data

Jun. 5, 2018   (JP) .............................. JP2018-107892

(51) Int. Cl.
  *B24C 9/00*   (2006.01)
  *C03C 19/00*  (2006.01)
  *B24C 1/08*   (2006.01)

(52) U.S. Cl.
  CPC ................ *B24C 9/00* (2013.01); *C03C 19/00* (2013.01); *B24C 1/08* (2013.01)

(58) Field of Classification Search
  CPC .. B24C 1/04; B24C 1/08; B24C 1/083; B24C 3/10; B24C 3/12; B24C 3/322
  See application file for complete search history.

(56) References Cited

U.S. PATENT DOCUMENTS

| | | | | |
|---|---|---|---|---|
| 3,339,318 A | * | 9/1967 | Graf | G02C 7/02 451/29 |
| 3,418,170 A | * | 12/1968 | Amsterdam | H01L 31/1804 257/459 |
| 3,520,086 A | | 7/1970 | Stevens | |
| 6,533,643 B1 | * | 3/2003 | Feng | B24C 1/04 451/75 |
| 2006/0222817 A1 | * | 10/2006 | Pauze | C25C 7/02 428/192 |

FOREIGN PATENT DOCUMENTS

| | | | | |
|---|---|---|---|---|
| JP | 09100142 A | * | 4/1997 | |
| JP | 2000-246641 A | | 9/2000 | |
| JP | 2001276689 A | * | 10/2001 | |
| JP | 2004-306219 A | | 11/2004 | |
| KR | 2004093861 A | * | 11/2004 | H01L 51/524 |

OTHER PUBLICATIONS

Extended European Search Report dated Oct. 17, 2019, in European Patent Application No. 19178514.6.

* cited by examiner

*Primary Examiner* — Joel D Crandall

(74) *Attorney, Agent, or Firm* — Birch, Stewart, Kolasch & Birch, LLP

(57) ABSTRACT

The invention provides a method for producing a synthetic quartz glass substrate, the method includes arranging spacers to be in contact with outer peripheral side surfaces of a synthetic quartz glass substrate, arranging plate materials to be in contact with the outer peripheral side surfaces of the spacers in a state that the plates are protruded from the surface of the substrate, and sandblasting the surface of the substrate.

9 Claims, 6 Drawing Sheets

METHOD FOR PRODUCING SYNTHETIC QUARTZ GLASS SUBSTRATE

CROSS-REFERENCE TO RELATED APPLICATION

This non-provisional application claims priority under 35 U.S.C. § 119(a) on Patent Application No. 2018-107892 filed in Japan on Jun. 5, 2018, the entire contents of which are hereby incorporated by reference.

TECHNICAL FIELD

The present invention relates to a method for producing a synthetic quartz glass substrate.

BACKGROUND ART

In a field relating to a large-sized flat panel display, more and more masks become to have an enlarged area. In such a field, when a large-sized synthetic quartz glass substrate supplied as a raw material is produced, it is quite important to reduce a loss of raw material and a processing time during slicing process of a substrate from a block of synthetic quartz glass into a piece having a specific size and finishing process of the piece to a synthetic quartz glass substrate having a high degree of flatness by polishing or the like.

When a synthetic quartz glass substrate is processed by sandblasting, as a processing characteristic of sandblasting, ridge portions between a surface of the substrate and chamfered surfaces are easily removed. In a case where the removal amount by sandblasting is large, a phenomenon that the ridge parts are largely processed and removed may be generated. Because of this, a width of the chamfers on each side of the resulting substrate may not be the same, or the width of the chamfers may be partially increased even on the same side. Such a variation in the width of the chamfers sometimes remains after the polishing in the subsequent process. Practical problem may be caused so that the resulting product is out of specification, and in the worst case where the ridge portions with the chamfered surfaces are cut inward too much, vacuum leakage occurs and the suction cannot be performed at the time of exposure.

In order to solve such a problem, as the method of preventing the local abrasion in ridge portions with chamfered surfaces of the substrate during sandblasting, Patent Document 1 proposes a method of suppressing the influence of an air flow by surrounding around the substrate with plate materials having a specific height.

CITATION LIST

Patent Document 1: JP-A 2004-306219

SUMMARY OF THE INVENTION

In sandblasting, the processing amount is adjusted at each of the positions on the substrate by changing an air pressure and a retention time of a nozzle for each of the positions on the synthetic quartz glass substrate. If there is a variation in the processing amount depending on the position on the substrate even under the same processing conditions, the degree of flatness of the substrate becomes deteriorated and the processing time in the subsequent process is prolonged. For example, in the method of Patent Document 1, when there are dimensional variations of the substrate, if a gap is formed between the plate materials and the side surfaces of the substrate, the influence of the air flow cannot be completely prevented. As a result, the air and abrasive grains come around in the gap, so that the side surface parts of the substrate may be abraded, or a variation in the processing amount in the vicinity of the side surfaces may be generated.

On the other hand, if the plate materials and the substrate are brought into close contact with each other so as not to form a gap, scratches may be generated on the side surfaces of the substrate due to the contact. In order to remove the scratches, the processing time in the subsequent process may be prolonged. The influence of the air flow also may not be suppressed for the complicated processing conditions, for example, changing the air pressure of sandblasting by steps during the processing.

An object of the invention is to provide a method for producing a synthetic quartz glass substrate by sandblasting process, in which the variation in the processing amount in ridge parts between a surface of the substrate and chamfered surfaces as well as the abrasion in side surface parts of the substrate are prevented, and the changes in a chamfered shape and a side shape are prevented.

The inventors have found that in processing the surface of the synthetic quartz glass substrate, especially the surface of the substrate which has been chamfered, by using sandblasting, spacers are arranged so as to be in contact with outer peripheral side surfaces of the substrate, and plate materials are arranged so as to be in contact with outer peripheral side surfaces of the spacers in a state of being protruded from a surface of the substrate, as a result of which the generation of a gap between the side surfaces of the substrate and the plate materials can be prevented, and the influence of the air flow can be effectively suppressed. Therefore, a variation in the processing amount in ridge parts between the surface of the substrate and the chamfered surfaces can be suppressed, and scratches are not generated on the side surfaces of the substrate due to the plate materials, so that the abrasion in the side surface parts of the substrate can be prevented, and the changes in the chamfered shape and the side shape can be suppressed.

In one aspect, the invention provides a method for producing a synthetic quartz glass substrate comprising the steps of:

arranging spacers to be in contact with outer peripheral side surfaces of a synthetic quartz glass substrate, arranging plate materials to be in contact with outer peripheral side surfaces of the spacers in a state that the plate materials are protruded from a surface of the substrate, and sandblasting the surface of the substrate.

Preferably, the spacers are as high as a thickness of the synthetic quartz glass substrate to be processed or higher than the surface of the substrate.

Preferably, the spacers are higher than the surface of the substrate by 10 mm or less.

Preferably, the spacers have a width of 5 to 15 mm.

Preferably, the synthetic, quartz glass substrate to be processed has chamfered surfaces in peripheral parts of the surface of the substrate, and spacers are arranged so as to be in contact with the chamfered surfaces in addition to the outer peripheral side surfaces of the substrate.

Preferably, the spacers are made of an elastic polymer compound or a nonwoven fabric which is stretchable in a width direction.

Preferably, the elastic polymer compound is selected from among a silicone rubber, a polyurethane rubber, a neoprene rubber, and an isoprene rubber.

Advantageous Effects of the Invention

According to the present invention, there is no local abrasion on the side surfaces of the synthetic quartz glass substrate and in the ridge parts between the surface of the substrate and the chamfered surfaces. As a result, a risk of generation of vacuum leakage particularly in the substrate suction at the time of exposure can be prevented, and thus the suction failure at the time of exposure can be eliminated.

BRIEF DESCRIPTION OF THE DRAWINGS

FIG. 1A is a plan view and FIG. 1B is a sectional view along the line ii-ii of FIG. 1A.

DESCRIPTION OF THE PREFERRED EMBODIMENT

The method for producing a synthetic quartz glass substrate according to the present invention is applied particularly to a large-sized synthetic quartz glass substrate, which is preferably used for producing a photomask substrate, an array side substrate of TFT liquid crystal, or the like. The substrate to be produced has a diagonal length of preferably 500 mm or more, and more preferably 500 to 2,000 mm. The shape of the substrate is not particularly limited, but may be a square, rectangular, circular, or the like. In a case of a circular shape, the diagonal length means a diameter of the circular shape. The thickness of the substrate is not particularly limited, and is preferably 1 to 20 mm, more preferably 1 to 15 mm, and even more preferably 5 to 12 mm.

As the synthetic quartz glass substrate to be processed, there are a synthetic quartz glass substrate which has been chamfered in peripheral parts and a substrate which has not been chamfered in peripheral parts. Of these, a synthetic quartz glass substrate which has been chamfered is suitably used. With respect to the synthetic quartz glass substrate which has been chamfered, a width of the chamfer is not particularly limited, and is preferably 0.3 to 1.5 mm.

Figure 1A:
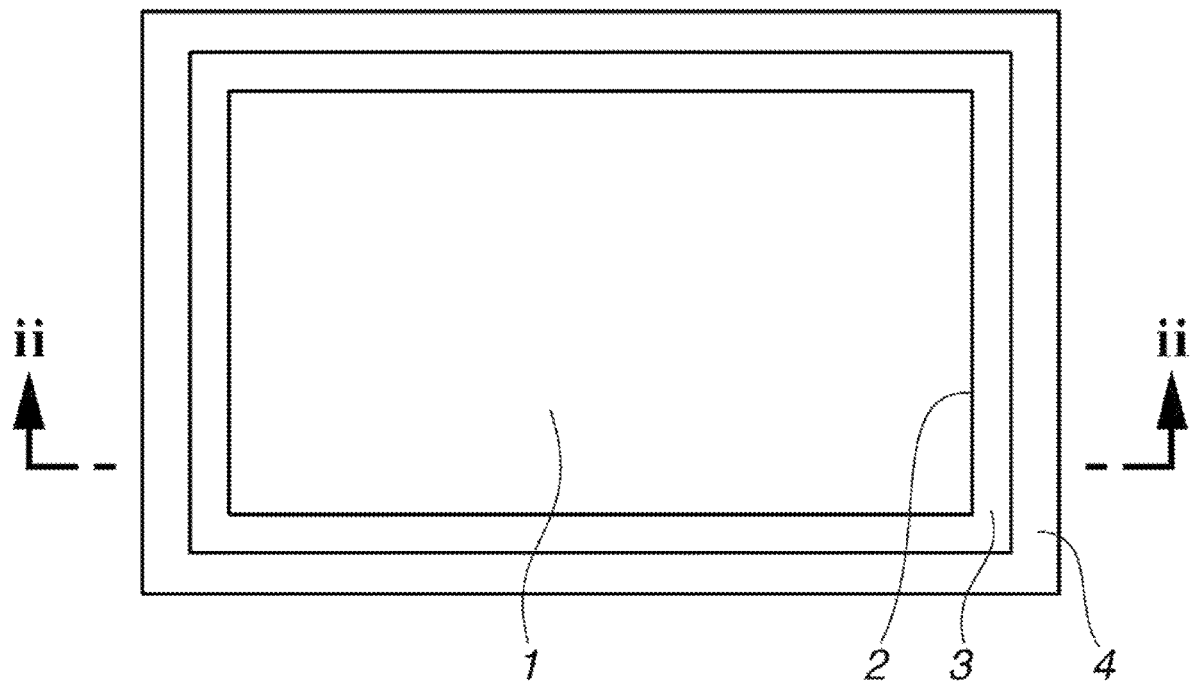
FIGS. 1A and 1B each shows an arrangement of a synthetic quartz glass substrate, spacers, and plate materials.
Figure 1B:
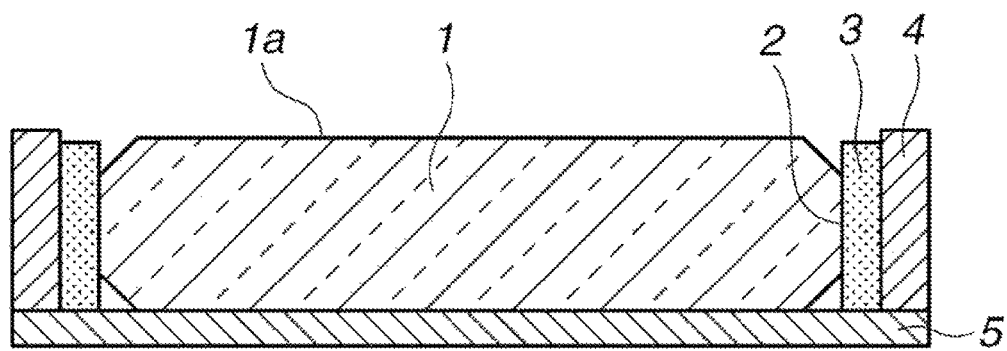

Surface of the synthetic quartz glass substrate is sandblasted. In the present invention, as shown in FIGS. 1A and 1B, spacers 3 are arranged so as to be in contact with the entire outer peripheral side surfaces 2 of the synthetic quartz glass substrate 1 to be sandblasted. Then, plate materials 4 are arranged so as to be in contact with the entire outer peripheral side surfaces of the spacers. In this way, the synthetic quartz glass substrate 1 surrounded by the plate materials 4 with the spacers 3 therebetween is fixed to a substrate holding table 5. The surface 1a of the synthetic quartz glass substrate 1 is sandblasted.

Figure 2:
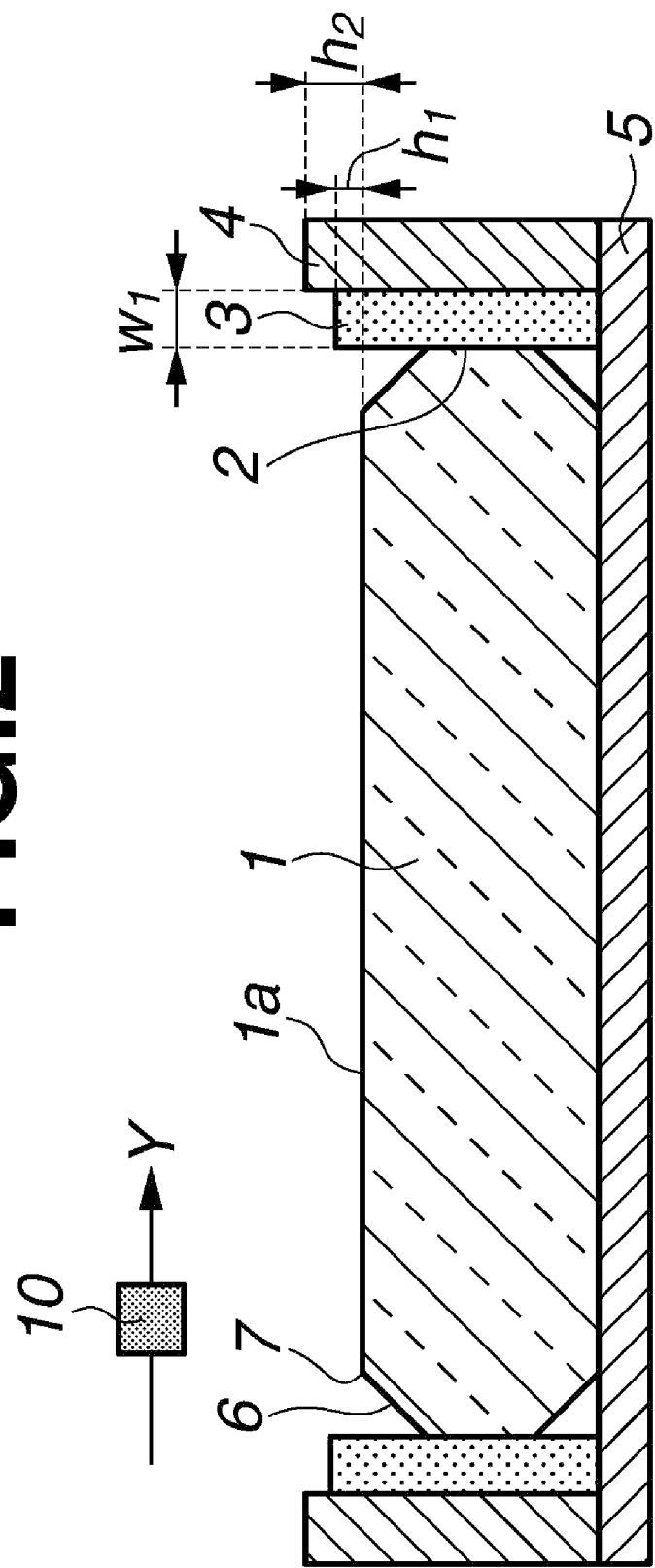
FIG. 2 is a sectional view showing an arrangement on a substrate holding table of a synthetic quartz glass substrate, spacers on side surfaces of the substrate, and plate materials, and a positional relationship among the substrate, the spacers, the plate materials, and a processing tool.

The spacers 3 to be in contact with the side surfaces 2 of the synthetic quartz glass substrate 1 may be as high as a thickness (height) of the synthetic quartz glass substrate 1 to be processed (FIG. 1B) or may be higher than the surface la of the substrate (FIG. 2). In FIG. 2, when the spacers 3 are higher than the surface 1a of the substrate, a protrusion height $h_1$ is preferably 10 mm or less, and more preferably 5 mm or less, and is preferably 0 mm or more. If the height of the spacers is lower than the thickness (height) of the synthetic quartz glass substrate, the abrasive grains may come around the side surface parts of the synthetic quartz glass substrate which have not been in contact with the spacers, and the local abrasion may be generated. On the other hand, if the protrusion height exceeds 10 mm, the air may hit against the spacers and the air flow around the air hitting may change, and a variation in the processing amount in the vicinity of the side surfaces of the synthetic quartz glass substrate may be generated.

In FIG. 2, a width $w_1$ of the spacers which are arranged to be in contact with side surfaces of the synthetic quartz glass substrate is preferably 5 to 15 mm, and more preferably 8 to 12 mm. If the width of the spacers to be in contact with the side surfaces is smaller than 5 mm, due to the influence of the air hitting against the plate materials, getting into a gap between the spacers and the substrate, or the like, when the air flow around the plate materials and the spacers is changed, the processing amount in the vicinity of the side surfaces of the substrate may be disturbed, and the local abrasion may be generated. On the other hand, if the width of the spaces is larger than 15 mm, a repulsive force is applied when the spacers are brought into contact with the plate materials without having a gap, and therefore, unnecessary force is applied to the synthetic quartz glass substrate when the synthetic quartz glass substrate is attached to a substrate holding table and when the synthetic quartz glass substrate is taken out from the substrate holding table. As a result, the workability may be deteriorated.

Figure 3:
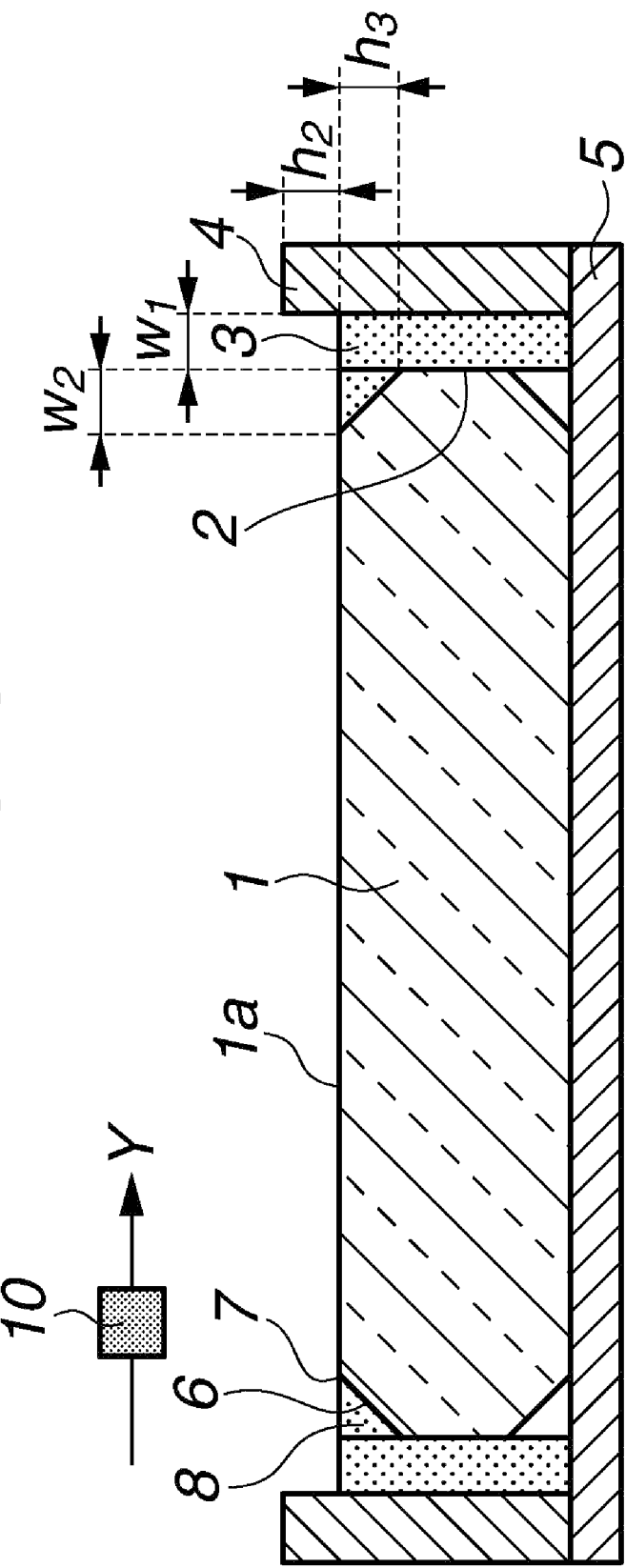
FIG. 3 is a sectional view showing an arrangement on a substrate holding table of a synthetic quartz glass substrate, spacers on side surfaces of the substrate and chamfered surfaces, and plate materials, and a positional relationship among the substrate, the spacers, the plate materials, and a processing tool.

As shown in FIG. 3, the spacers can be arranged so as to be in contact also with chamfered surfaces 6 in addition to the outer peripheral side surfaces of the substrate as needed. By arranging the spacers 8 on the chamfered surfaces, the abrasion of the ridge portions 7 between the surface of the substrate and the chamfered surfaces can be reliably prevented. The spacers 8 to be in contact with the chamfered surfaces are preferably adjusted depending on the width of the chamfers of the substrate and the angle of the chamfered surfaces, and is preferably arranged so as to be in contact with the entire chamfered surfaces and so as not to generate a gap with the spacers 3 that is in contact with the outer peripheral side surfaces of the substrate. A width $w_2$ of the spacers to be in contact with the chamfered surfaces is preferably 0.5 to 6 mm, more preferably 2 to 6 mm, and even more preferably 3 to 5 mm. From the viewpoint of preventing disturbance of the air flow in the vicinity of the substrate, which is caused by the air hitting against the spacers being in contact with the chamfered surfaces, the spacers are preferably arranged so that it is as high as the spacers being in contact with the outer peripheral side surfaces of the substrate. That is, a height $h_3$ of the spacers to be in contact with the chamfered surfaces is the same height as that of the spacers being in contact with the outer peripheral side surfaces of the substrate (so as not to be protruded from the surface 1a of the substrate).

Examples of the material for the spacers include elastic polymer compounds which are stretchable in a width direction, such as a silicone rubber, a polyurethane rubber, a neoprene rubber, and an isoprene rubber, and nonwoven fabrics made of synthetic resins such as polyester, polyethylene, and polypropylene. These materials can be used for both of the spacers to be arranged on the outer peripheral side surfaces of the substrate and the spacers to be arranged on the chamfered surfaces. For example, if the material for the spacers is a material like a metal, such a metal is abraded by sandblasting the abrasive grains and a gap is generated. As a result, the air flow in the vicinity of the gap may be disturbed, control of the processing amount may become difficult, and foreign substances generated from the abrasion may hit against the processed substrate and cause scratches on the substrate.

Figure 4:
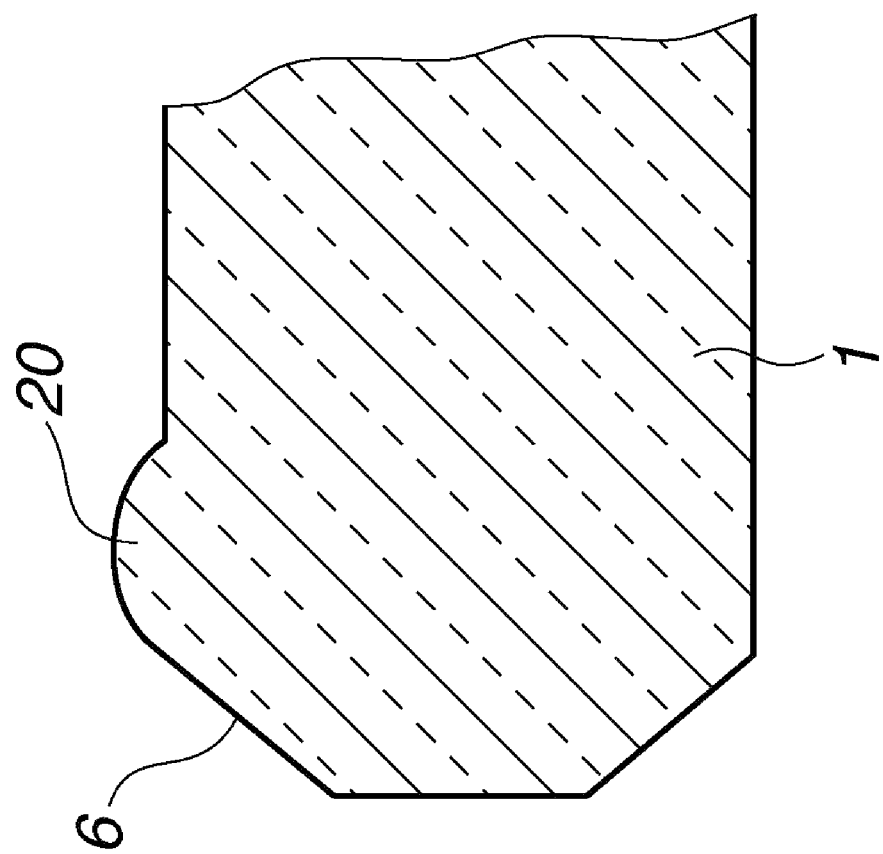
FIG. 4 is a partially omitted sectional view showing a projection phenomenon caused due to the absence of progression of the removal of a surface of the substrate in the vicinity of a ridgeline.

On the other hand, as shown in FIGS. 2 and 3, the plate materials 4 are arranged so as to be higher than the height (thickness) of the synthetic quartz glass substrate 1 and so as to be protruded from the surface 1a of the synthetic quartz glass substrate 1. A protrusion height $h_2$ of the plate materials 4 from the surface 1a of the synthetic quartz glass substrate 1 is preferably 0.1 to 15 mm, and more preferably 0.3 to 10 mm. If the protrusion height $h_2$ is too low, the abrasion in the ridge parts of ridge portions 7 between the surface of the synthetic quartz glass substrate 1 and the chamfered surfaces 6 progresses, and the object of the present invention may not be achieved. If the protrusion height $h_2$ is too high, the abrasion in the ridge parts can be suppressed. However, removal of the surface of the substrate in the vicinity of the ridge portions 7 does not progress, and therefore, the surface of the substrate becomes projected (FIG. 4), and the projected part 20 may not be removed even in the subsequent process. Subsequently, in a case where the projected part 20 remains, leakage may be caused in vacuum suction.

From the viewpoint of hardly shifting the contact on the contact surface between the spacers and the substrate when the spacers are brought into contact with the outer peripheral side surfaces of the substrate, the plate materials are preferably as high as the spacers to be in contact with the outer peripheral side surfaces of the substrate or higher than those. When the plate materials are arranged to be higher than the spacers, the difference between the height of the plate materials and the height of the spacers ($h_2 - h_1$) is preferably 10 mm or less, and more preferably 5 mm or less. The above difference is preferably 0 mm or more, and more preferably 0.2 mm or more.

The plate materials are preferably made of a material which is hard to be abraded by sandblasting. Examples of such material include a polyurethane resin, a fluorine resin, and a nylon resin.

When the synthetic quartz glass substrate and the plate materials are arranged, it is desired that the spacers and the plate materials are arranged so as to be firmly brought into contact with each other and not to generate a gap. If the gap is generated, the abrasive grains and the air enter the gap during sandblasting, the air flow in the vicinity of the gap is disturbed. As a result, the local abrasion may be generated in side surface parts of the substrate.

As the method for sandblasting, any known method can be adopted. For example, as the abrasive grains, alumina abrasive grains, silicon carbide abrasive grains, or the like can be used. The particle diameter of the abrasive grains is not particularly limited and preferably #600 to #3000. The air pressure is also not particularly limited and preferably 0.01 to 0.3 MPa.

Figure 5:
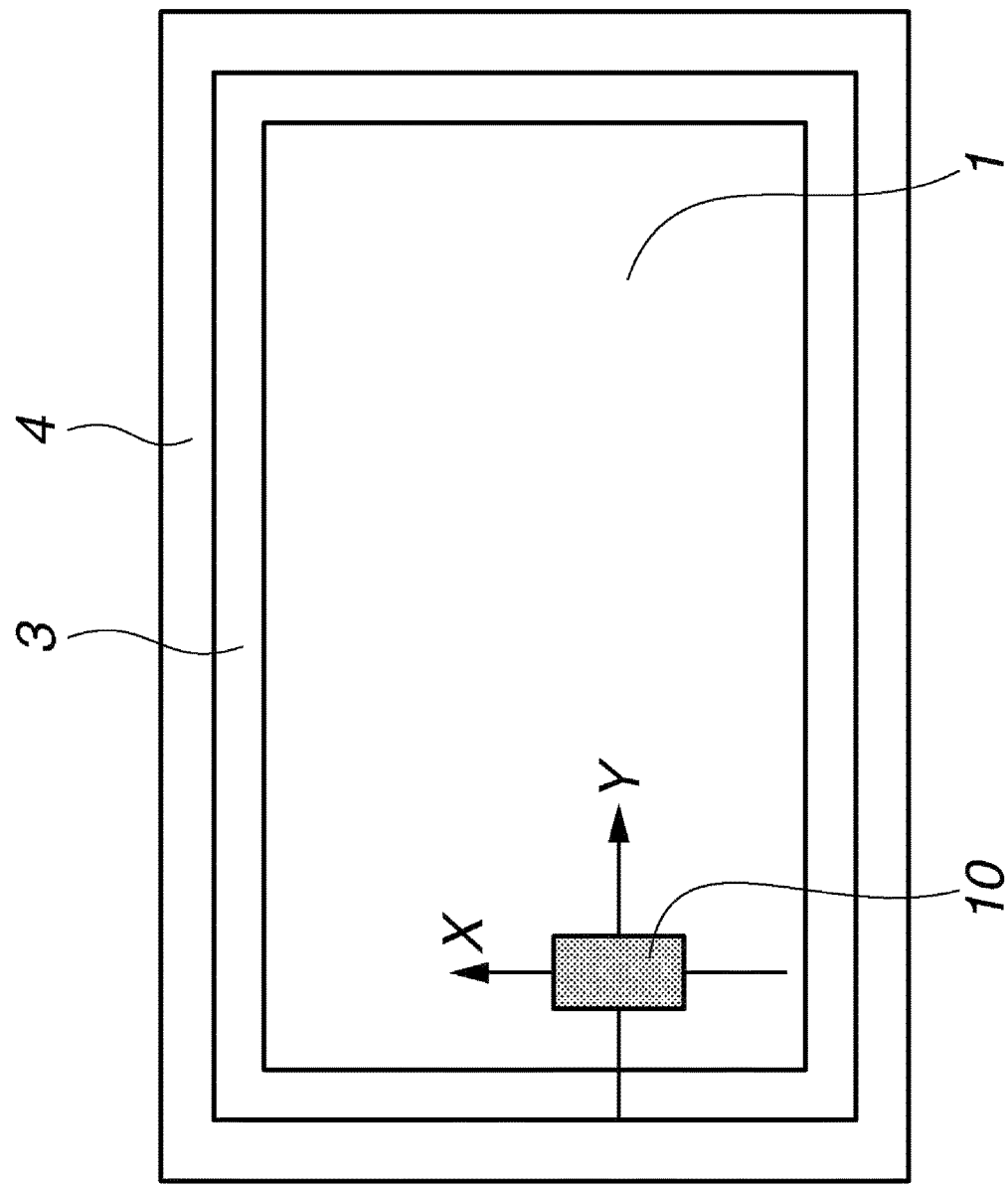
FIG. 5 is a plan view showing an arrangement on a substrate holding table of a synthetic quartz glass substrate, spacers, and plate materials, and a positional relationship among the substrate, the spacers, the plate materials, and a processing tool.
Figure 6:
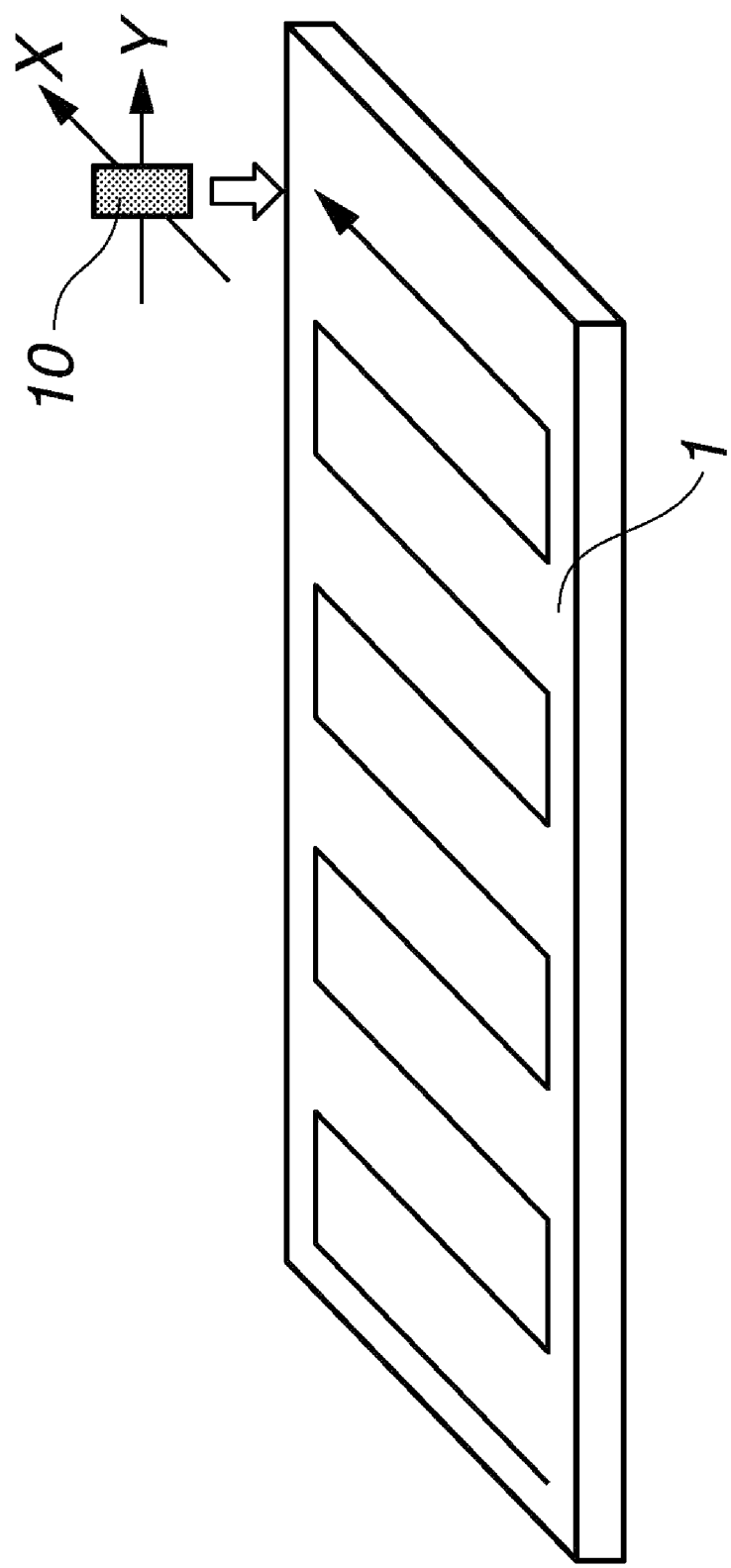
FIG. 6 is a perspective view showing a moving direction of a processing tool.

As the processing tool, for example, a tool shown in each of FIGS. 5 and 6 can be used. The processing tool 10 has a structure capable of arbitrarily moving in the X-axis and Y-axis directions. The movement can be controlled by a computer. The processing can be performed with an X-θ mechanism. Since the air pressure has a relationship with the abrasive grains to be used and the distance between the processing tool and the substrate, it cannot be particularly determined. But, it can be adjusted in consideration of the removal rate and the processing strain depth.

When sandblasting is performed in accordance with the present invention, sandblasting can be performed by storing height data in a computer on the basis of the degree of flatness data which have been measured in advance. Then, by controlling the retention time of the processing tool such that the movement speed of a processing tool is decreased and the retention time is increased in a high part, while the movement speed of the processing tool is conversely increased and the retention time is decreased in a low part.

Before and after the processing, the surface roughness (Ra) is measured on the chamfered surfaces and in the side surface parts of the substrate. In the measurement of the surface roughness, the roughness measuring instrument to be used is not particularly limited as long as it is a general roughness measuring instrument, and a roughness measuring instrument manufactured by Mitutoyo Corporation may be used.

In the production method according to the present invention, since only a high part of the substrate is selectively removed, the substrate having a low degree of flatness can be reliably improved. Not only the substrate having a high degree of flatness can be obtained by precise control of the processing tool, but also the improvement of the degree of flatness of the substrate can be realized in a short period of time by rough control.

The synthetic quartz glass substrate obtained by the sandblasting of the present invention can be used as a photomask substrate, an array side substrate of TFT liquid crystal, or the like through the steps of washing the synthetic quartz glass substrate, then forming a metal film, forming a resist film, drawing a circuit pattern with exposure, removing the resist film, and the like.

EXAMPLES

Examples of the invention are given below by way of illustration and not by way of limitation.

In the following Examples, the degree of flatness and the degree of parallelness were measured by using a flatness tester manufactured by KURODA Precision Industries Ltd. The surface roughness was measured by a roughness measuring instrument manufactured by Mitutoyo Corporation.

Presence or absence of scratches was confirmed by light-collective visual inspection in a dark room. When a bright spot or a bright line which can be clearly identified appears in a light-collected part, it is determined as "presence", and in a case where a bright spot or a bright line is not observed at a light-collected part, it is determined as "absence".

Example 1

A synthetic quartz glass substrate having a size of 1,220× 1,400 mm and a thickness of 13.6 mm was processed with a lapping device by using silicon carbide abrasive grains GC #600 manufactured by Fujimi Abrasives Manufacturing Co., Ltd. to prepare a raw-material substrate. At this time, an angle of chamfered surfaces was 45°, a width of chamfers was 0.9 mm, a degree of flatness of a surface was 80 μm, and a degree of parallelness was 4 When side surface parts were inspected, the surface roughness (Ra) was 0.04 μm. There were no scratches which were able to be identified at the level of visual inspection.

As shown in FIG. 3, the obtained raw-material substrate was attached to a substrate holding table. At that time, silicone rubbers having a height of 13.6 mm which was the same as the thickness of the raw-material substrate and a width $w_1$ of 10 mm were arranged as spacers so as to be in contact with the four sides of the outer peripheral side surface of the raw-material substrate. Silicone rubbers having a width $w_2$ of 0.9 mm which was the same as the width of the chamfers and a height $h_3$ of 3 mm covered on chamfered parts and fixed with a tape. Then, the substrate was arranged onto a holding table.

In the substrate holding table, plate materials made of a polyurethane resin and having a height of 14.0 mm ($h_2$=0.4 mm) was arranged as plate materials so as to be in contact with outer peripheral side surfaces of the spacers. As shown in FIG. 5, as the processing device, a processing device having a structure in which a sandblast nozzle being a processing tool 10 was attached to and rotatable by a motor (not shown) and a structure in which the processing tool was pressurized with the air was used. The sandblast nozzle had a structure in which the sandblast nozzle was movable substantially parallel to the substrate holding table in the X-axis and Y-axis directions.

Alumina abrasive grains FO #1000 (manufactured by Fujimi Abrasives Manufacturing Co., Ltd.) was used as the abrasive grains of a blasting material. The air pressure was set to 0.1 MPa. As the processing method, a method in which the sandblast nozzle being the processing tool 10 was continuously moved in parallel to the X-axis and moved in the Y-axis direction at a pitch of 30 mm as shown by the arrow in FIG. 6 was employed. The movement speed of the sandblast nozzle was set to 50 mm/sec in the lowest outer peripheral part of the substrate in a raw-material substrate shape. With respect to the movement speed in each part of the substrate, a required retention time of the sandblast nozzle in each part of the substrate was determined from the processing speed, the movement speed was calculated from the required retention time, and the processing position was moved by moving the sandblast nozzle, and thus the processing was performed on both sides. The removal amount of sandblasting in the highest position on the short side of the substrate was set to 100 μm, and the processing was performed.

After that, the synthetic quartz glass substrate was taken out, the surface roughness on each of the side surfaces and the chamfered surfaces was measured. The scratches were identified in a dark room by light-collected visual inspection. The results are shown in Table 1.

Example 2

The processing was performed in the same manner as in Example 1 except that the synthetic quartz glass substrate having a size of 1,220×1,400 mm and a thickness of 13.6 mm, which had not been chamfered, was used as the raw-material substrate. The side surfaces of the obtained synthetic quartz glass substrate were evaluated in the same manner as in Example 1. The results are shown in Table 1.

Example 3

The processing was performed in the same manner as in Example 1 except that the air pressure at the time of sandblasting was set to 0.3 MPa. The side surfaces and the chamfered surfaces of the obtained synthetic quartz glass substrate were evaluated in the same manner as in Example 1. The results are shown in Table 1.

Example 4

The processing was performed in the same manner as in Example 1 except that isoprene rubbers were used in place of the silicone rubbers as the spacers. The side surfaces and the chamfered surfaces of the obtained synthetic quartz glass substrate were evaluated in a similar manner as in Example 1. The results are shown in Table 1.

Example 5

The processing was performed in the same manner as in Example 1 except that silicone rubbers having a height of 18.0 mm ($h_1$=4.4 mm) were used as the spacers, and plate materials made of a polyurethane resin and having a height of 20.0 mm ($h_2$=6.4 mm) was used. The side surfaces and the chamfered surfaces of the obtained synthetic quartz glass substrate were evaluated in the same manner as in Example 1. The results are shown in Table 1.

Example 6

The processing was performed in the same manner as in Example 5 except that the air pressure at the time of sandblasting was set to 0.3 MPa. The side surfaces and the chamfered surfaces of the obtained synthetic quartz glass substrate were evaluated in the same manner as in Example 1. The results are shown in Table 1.

Comparative Example 1

The processing was performed in the same manner as in Example 1 except that when a raw-material substrate was attached to a substrate holding table, spacers were not brought into contact with outer peripheral side surfaces of the substrate and chamfered surfaces. The side surfaces and the chamfered surfaces of the obtained synthetic quartz glass substrate were evaluated in the same manner as in Example 1. The results are shown in Table 1.

TABLE 1

| | Before processing | | | | After processing | | | | Spacer | | |
|---|---|---|---|---|---|---|---|---|---|---|---|
| | Surface roughness (Ra) on side surfaces [μm] | Surface roughness (Ra) on chamfered surfaces [μm] | Scratches on side surface | Scratches on chamfered surfaces | Surface roughness (Ra) on side surfaces [μm] | Surface roughness (Ra) on chamfered surface [μm] | Scratches on side surfaces | Scratches on chamfered surfaces | Material | Height [mm] | $h_1$ [mm] |
| Example 1 | 0.04 | 0.04 | Absence | Absence | 0.04 | 0.04 | Absence | Absence | Silicone rubber | 13.6 | 0 |
| Example 2 | 0.04 | — | Absence | — | 0.04 | — | Absence | — | Silicone rubber | 13.6 | 0 |
| Example 3 | 0.04 | 0.04 | Absence | Absence | 0.04 | 0.04 | Absence | Absence | Silicone rubber | 13.6 | 0 |

TABLE 1-continued

| | Before processing | | | | After processing | | | | Spacer | | |
|---|---|---|---|---|---|---|---|---|---|---|---|
| | Surface roughness (Ra) on side surfaces [μm] | Surface roughness (Ra) on chamfered surfaces [μm] | Scratches on side surface | Scratches on chamfered surfaces | Surface roughness (Ra) on side surfaces [μm] | Surface roughness (Ra) on chamfered surface [μm] | Scratches on side surfaces | Scratches on chamfered surfaces | Material | Height [mm] | $h_1$ [mm] |
| Example 4 | 0.04 | 0.04 | Absence | Absence | 0.04 | 0.04 | Absence | Absence | Isoprene rubber | 13.6 | 0 |
| Example 5 | 0.04 | 0.04 | Absence | Absence | 0.04 | 0.04 | Absence | Absence | Silicone rubber | 18.0 | 4.4 |
| Example 6 | 0.04 | 0.04 | Absence | Absence | 0.04 | 0.04 | Absence | Absence | Silicone rubber | 18.0 | 4.4 |
| Comparative Example 1 | 0.04 | 0.04 | Absence | Absence | 0.06 | 0.06 | Presence | Presence | Absence | | |

Japanese Patent Application No. 2018-107892 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for producing a synthetic quartz glass substrate comprising the steps of:
    arranging a plate shaped spacer to be in contact with outer peripheral side surfaces of a synthetic quartz glass substrate,
    arranging a plate material to be in contact with outer peripheral side surfaces of the spacer so that the plate material is protruded from a surface of the substrate, and
    sandblasting the surface of the substrate.

2. The method for producing a synthetic quartz glass substrate according to claim 1, wherein the spacer is as high as a thickness of the synthetic quartz glass substrate to be processed or higher than the surface of the substrate.

3. The method for producing a synthetic quartz glass substrate according to claim 2, wherein the spacer is higher than the surface of the substrate by 10 mm or less.

4. The method for producing a synthetic quartz glass substrate according to claim 1, wherein the spacer has a width of 5 to 15 mm.

5. The method for producing a synthetic quartz glass substrate according to claim 1, wherein the synthetic quartz glass substrate to be processed has chamfered surfaces in peripheral parts of the surface thereof, and the spacer is arranged so as to be in contact with the chamfered surfaces in addition to the outer peripheral side surfaces of the substrate.

6. The method for producing a synthetic quartz glass substrate according to claim 1, wherein the spacer is made of an elastic polymer compound or a nonwoven fabric which is stretchable in a width direction.

7. The method for producing a synthetic quartz glass substrate according to claim 6, wherein the elastic polymer compound is at least one compound selected from the group consisting of a silicone rubber, a polyurethane rubber, a neoprene rubber, and an isoprene rubber.

8. The method for producing a synthetic quartz glass substrate according to claim 1, wherein the spacer has a width of 8 to 12 mm.

9. The method for producing a synthetic quartz glass substrate according to claim 1, wherein the spacer is a single spacer that completely surrounds said substrate.

* * * * *